Dec. 27, 1932.        R. RICHTER            1,892,162
              PHOTOGRAPHIC THREE-LENS OBJECTIVE
                    Filed May 12, 1931
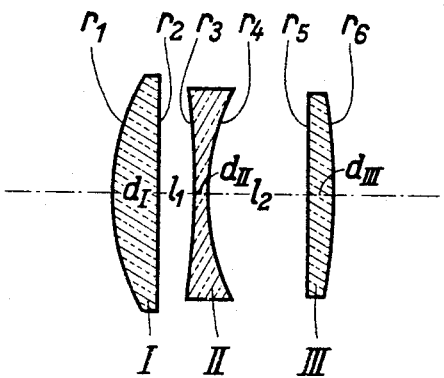
| | | |
|---|---|---|
| $r_1 = +23.25$ | $d_I = 4.5$ | |
| $r_2 = \infty$ | $l_1 = 3.7$ | |
| $r_3 = -78.6$ | $d_{II} = 1.3$ | |
| $r_4 = +22.85$ | $l_2 = 10.0$ | |
| $r_5 = +205.0$ | $d_{III} = 2.5$ | |
| $r_6 = -59.96$ | | |
| | I | II | III |
|---|---|---|---|
| $n_D$ = | 1.6227 | 1.6128 | 1.6423 |
| $\nu$ = | 56.9 | 37.0 | 48.0 |
*Inventor:*
Robert Richter Patented Dec. 27, 1932

1,892,162

UNITED STATES PATENT OFFICE

ROBERT RICHTER, OF JENA, GERMANY, ASSIGNOR TO THE FIRM CARL ZEISS, OF JENA, GERMANY

PHOTOGRAPHIC THREE-LENS OBJECTIVE

Application filed May 12, 1931, Serial No. 536,813, and in Germany May 27, 1930.

I have filed an application in Germany, May 27, 1930.

The invention relates to astigmatically corrected photographic objectives having an aperture ratio ranging between 1:5 and 1:4 and being adapted to be used in hand cameras. Objectives of this kind are required to define with sufficient clearness a size of picture the diagonal of which is approximately equal to the focal length of the objective, and, at the same time, their vertex length is not permitted to exceed one quarter of the focal length. Objectives fulfilling these conditions consist of at least four lenses and this because three-lens objectives afford pictures of distinctively inferior quality.

The present invention aims at providing an anastigmatic three-lens objective the efficiency of which comes so near that of a four-lens objective that it can be used for the said purpose to the best advantage. The qualities of the new objective which belongs to the known kind in which a dispersive lens is enclosed by two converging lenses separated from this dispersive lens by intermediate air spaces, depend upon the dimensions of the said air spaces, upon the curvatures of the first and fourth lens surfaces, and upon the mutual distance of these two surfaces. According to the invention the first air space has to be the smaller one, the absolute values of the radii of curvature of the first and fourth surfaces have to amount to 20 to 26% of the focal length of the objective, and the mutual distance of the vertices of these two surfaces has to be greater than 7.5% of the focal length of the objective.

The efficiency of the objective will be specially pronounced when the third lens is made of glass whose refractive index for the D-line is greater than 1.63.

The accompanying drawing and the table below give an example of an objective constructed according to the invention, whose maximum aperture is 1:4.5 and whose focal length amounts to 100 mm. The figures in the table represent millimeters.

| Radii | Thicknesses and distances |
|---|---|
| $r_1 = + 23.25$ | $d_I = 4.5$ |
| $r_2 = \infty$ | $l_I = 3.7$ |
| $r_3 = - 78.6$ | $d_{II} = 1.3$ |
| $r_4 = + 22.85$ | $l_2 = 10.0$ |
| $r_5 = +205.0$ | $d_{III} = 2.5$ |
| $r_6 = - 59.96$ | |

Kinds of glass

| | I | II | III |
|---|---|---|---|
| $n_D =$ | 1.6227 | 1.6128 | 1.6423 |
| $\nu =$ | 56.9 | 37.0 | 48.0 |

The diameters of these lenses are, respectively:

$D_I = 23.4 \quad D_{II} = 20.8 \quad D_{III} = 20.0$

As shown in the above table, the distance from the first to the fourth lens vertex amounts to 9.5% and the vertex length to 22% of the focal length of the objective.

I claim:

1. A photographic three-lens objective, corrected astigmatically, having an aperture ratio ranging between 1:5 and 1:4, consisting of two converging lenses, each of these lenses being a single piece of glass, and a dispersive lens so enclosed between the said converging lenses that it is separated from them by air spaces, the air space between the front converging lens and the dispersive lens being inferior to the air space between the dispersive lens and the rear converging lens, the absolute values of the radii of curvature of the first and fourth surfaces amounting to 20 to 26% of the focal length of the objective, the mutual distance of the vertices of these two surfaces being greater than 7.5% of the focal length, and the mutual distance of the front and rear vertices of the objective being inferior to one quarter of the focal length.

2. In an objective according to claim 1 the rear converging lens being of glass whose refractive index for the D-line is greater than 1.63.

ROBERT RICHTER.